US012392945B2

(12) United States Patent
Ockenfuss

(10) Patent No.: US 12,392,945 B2
(45) Date of Patent: Aug. 19, 2025

(54) INDUCED TRANSMISSION FILTER WITH HYDROGENATED SILICON, SILVER, AND SILICON DIOXIDE

(71) Applicant: VIAVI Solutions Inc., San Jose, CA (US)

(72) Inventor: Georg J. Ockenfuss, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 431 days.

(21) Appl. No.: 16/948,957

(22) Filed: Oct. 7, 2020

(65) Prior Publication Data

US 2021/0333454 A1 Oct. 28, 2021

Related U.S. Application Data

(60) Provisional application No. 63/016,731, filed on Apr. 28, 2020.

(51) Int. Cl.
*G02B 5/20* (2006.01)
*G02B 5/28* (2006.01)
*G06V 40/20* (2022.01)

(52) U.S. Cl.
CPC ............. *G02B 5/207* (2013.01); *G02B 5/208* (2013.01); *G02B 5/281* (2013.01); *G02B 5/285* (2013.01); *G06V 40/20* (2022.01)

(58) Field of Classification Search
CPC ... G02B 5/207; G02B 5/208; G02B 5/28–289
See application file for complete search history.

(56) References Cited

U.S. PATENT DOCUMENTS

| 7,133,197 | B2 | 11/2006 | Ockenfuss et al. |
|---|---|---|---|
| 9,354,369 | B2 | 5/2016 | Hendrix et al. |
| 9,568,362 | B2 | 2/2017 | Sugio |
| 9,588,269 | B2 | 3/2017 | Hendrix et al. |
| 9,746,678 | B2 | 8/2017 | Diehl et al. |
| 10,197,716 | B2 | 2/2019 | Ockenfuss et al. |

(Continued)

FOREIGN PATENT DOCUMENTS

| CN | 106170730 A | 11/2016 |
|---|---|---|
| CN | 107037520 A | 8/2017 |

(Continued)

OTHER PUBLICATIONS

Extended European Search Report for Application No. EP21170801. 1, mailed on Dec. 13, 2021, 13 pages.

(Continued)

*Primary Examiner* — Ryan S Dunning
(74) *Attorney, Agent, or Firm* — Harrity & Harrity, LLP

(57) ABSTRACT

An induced transmission filter may include a set of optical filter layers. The set of optical filter layers may include a first subset of optical filter layers comprising a first material with a first refractive index, the first material comprising at least silicon and hydrogen. The set of optical filter layers may include a second subset of optical filter layers comprising a second material with a second refractive index. The second material may be different from the first material and the second refractive index may be less than the first refractive index. The second material may include at least silver.

20 Claims, 22 Drawing Sheets

(56) References Cited

U.S. PATENT DOCUMENTS

| | | | |
|---|---|---|---|
| 10,222,526 | B2 | 3/2019 | Hendrix et al. |
| 10,451,783 | B2 | 10/2019 | Ockenfuss |
| 10,651,216 | B2 | 5/2020 | Ockenfuss |
| 11,009,636 | B2 | 5/2021 | Ockenfuss et al. |
| 11,049,893 | B2 | 6/2021 | Ockenfuss |
| 11,567,251 | B2 | 1/2023 | Ockenfuss et al. |
| 2005/0185267 | A1* | 8/2005 | Ockenfuss ............ G02B 5/282 359/359 |
| 2009/0161521 | A1 | 6/2009 | Kamada et al. |
| 2011/0222160 | A1* | 9/2011 | Yamazaki ................ G02B 1/14 156/273.3 |
| 2014/0170765 | A1* | 6/2014 | Ockenfuss ........... A61B 5/1455 436/501 |
| 2015/0346403 | A1* | 12/2015 | Jidai ....................... H04N 5/33 359/359 |
| 2017/0186793 | A1* | 6/2017 | Ockenfuss ............. H10K 59/38 |
| 2018/0204864 | A1 | 7/2018 | Ockenfuss |
| 2018/0267220 | A1 | 9/2018 | Frey |
| 2019/0064532 | A1* | 2/2019 | Riley, Jr. ................ G02B 1/002 |
| 2019/0074314 | A1* | 3/2019 | Kuo .................. H01L 27/14621 |
| 2019/0285784 | A1 | 9/2019 | Ockenfuss et al. |
| 2020/0142111 | A1* | 5/2020 | Houck ..................... G02B 5/26 |
| 2020/0319386 | A1* | 10/2020 | Chen .................. H01J 37/3426 |

FOREIGN PATENT DOCUMENTS

| | | |
|---|---|---|
| CN | 107086222 A | 8/2017 |
| CN | 110275226 A | 9/2019 |
| CN | 110673250 A | 1/2020 |
| EP | 3187909 A1 | 7/2017 |
| EP | 3206060 A1 | 8/2017 |
| EP | 3407103 A1 | 11/2018 |
| JP | 2007102124 A | 4/2007 |
| JP | 2017516914 A | 6/2017 |
| JP | 2019050345 A | 3/2019 |
| JP | 2019191566 A | 10/2019 |
| TW | 201734415 A | 10/2017 |
| TW | 201902691 A | 1/2019 |

OTHER PUBLICATIONS

Jen Y J., "Design and Fabrication of a Narrow Bandpass Filter with Low Dependence on Angle of Incidence," Coatings, Jun. 2018, vol. 8(7), 8 pages.

Partial European Search Report for Application No. 21170801.1, mailed on Sep. 10, 2021, 15 pages.

* cited by examiner

| Layer # | material Name | Thickness [nm] |
|---|---|---|
| 1 | NbTiOx | 74.2402 |
| 2 | ZnO | 2 |
| 3 | Ag | 16.6729 |
| 4 | ZnO | 2 |
| 6 | NbTiOx | 128.6865 |
| 7 | ZnO | 2 |
| 8 | Ag | 33.7655 |
| 9 | ZnO | 2 |
| 11 | NbTiOx | 131.6066 |
| 12 | ZnO | 2 |
| 13 | Ag | 31.5813 |
| 14 | ZnO | 2 |
| 16 | NbTiOx | 95.9508 |
| 17 | ZnO | 2 |
| 18 | Ag | 10 |
| 19 | ZnO | 2 |
| 21 | NbTiOx | 85.3692 |
| 22 | ZnO | 2 |
| 23 | Ag | 19.2087 |
| 24 | ZnO | 2 |
| 26 | NbTiOx | 247.998 |

100

| Layer # | material Name | Thickness [nm] |
|---|---|---|
| 1 | NbTiOx | 77.5044 |
| 2 | ZnO | 2 |
| 3 | Ag | 15 |
| 4 | ZnO | 2 |
| 6 | NbTiOx | 132.0954 |
| 7 | ZnO | 2 |
| 8 | Ag | 33.2002 |
| 9 | ZnO | 2 |
| 11 | NbTiOx | 133.878 |
| 12 | ZnO | 2 |
| 13 | Ag | 34.6274 |
| 14 | ZnO | 2 |
| 16 | NbTiOx | 129.3702 |
| 17 | ZnO | 2 |
| 18 | Ag | 16.9796 |
| 19 | ZnO | 2 |
| 21 | NbTiOx | 161.246 |
| 22 | ZnO | 2 |
| 23 | Ag | 15 |
| 24 | ZnO | 2 |
| 26 | NbTiOx | 85 |
| 27 | a-Si | 11.86692 |
| 28 | SiO2 | 42.10783 |
| 29 | a-Si | 64.43119 |
| 30 | SiO2 | 163.761 |
| 31 | a-Si | 33.42019 |
| 32 | SiO2 | 15.80738 |
| 33 | a-Si | 55.23013 |
| 34 | SiO2 | 25 |

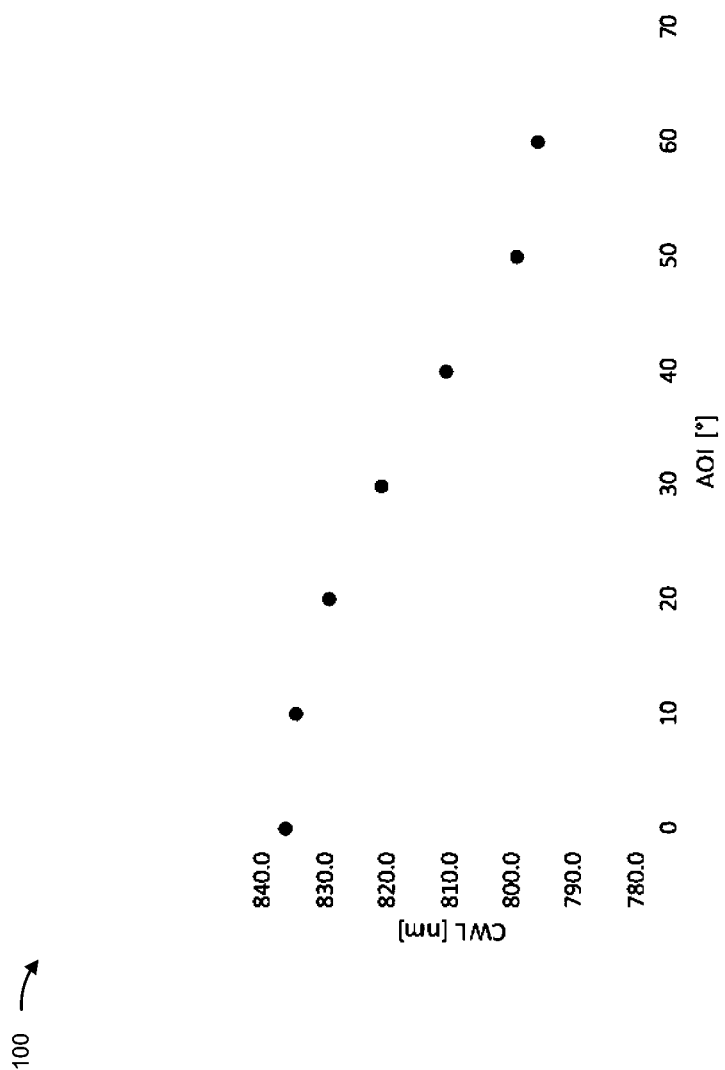

| Layer # | Material Name | Thickness [nm] |
|---|---|---|
| 1 | a-Si | 37.96757 |
| 2 | Ag | 27.15452 |
| 3 | a-Si | 173.6102 |
| 4 | Ag | 28.76332 |
| 5 | a-Si | 170.1819 |
| 6 | Ag | 30.17507 |
| 7 | a-Si | 70.63483 |
| 8 | SiO2 | 32.55481 |
| 9 | a-Si | 35.81125 |
| 10 | SiO2 | 20 |

FIG. 2A

INDUCED TRANSMISSION FILTER WITH HYDROGENATED SILICON, SILVER, AND SILICON DIOXIDE

CROSS-REFERENCE TO RELATED APPLICATION

This patent application claims priority to U.S. Provisional Patent Application No. 63/016,731, filed on Apr. 28, 2020, and entitled "INDUCED TRANSMISSION FILTER WITH HYDROGENATED SILICON AND SILVER." The disclosure of the prior application is considered part of and is incorporated by reference into this patent application.

BACKGROUND

An optical transmitter may emit light that is directed toward one or more objects. For example, in a gesture recognition system, the optical transmitter may transmit near infrared (NIR) light toward a user, and the NIR light may be reflected off the user toward an optical receiver. In this case, the optical receiver may capture information regarding the NIR light, and the information may be used to identify a gesture being performed by the user. For example, a device may use the information to generate a three-dimensional representation of the user, and to identify the gesture being performed by the user based on the three-dimensional representation. In other examples, systems may use optical transmitters and optical receivers for ranging, object recognition, spectroscopy, health monitoring, and/or the like.

In some cases, during transmission of light, a particular pattern of transmitted light or band of transmitted light may be desired, so a light shaping optic may be disposed in an optical path between an optical transmitter and a target. Similarly, during transmission of transmitted light toward a target and/or during reflection from the target the optical receiver, ambient light may interfere with the transmitted light. In such cases, an optical filter may be disposed in an optical path between the target and an optical receiver. For example, an optical receiver may be optically coupled to an induced transmission filter, a bandpass filter, and/or the like to filter some wavelengths of light (e.g., wavelengths corresponding to ambient light) and to allow other wavelengths of light (e.g., wavelengths corresponding to, for example, transmitted MR light) to pass through toward the optical receiver.

SUMMARY

According to some possible implementations, an induced transmission filter may include a set of optical filter layers. The set of optical filter layers may include a first subset of optical filter layers comprising a first material with a first refractive index, the first material comprising at least silicon and hydrogen. The set of optical filter layers may include a second subset of optical filter layers comprising a second material with a second refractive index. The second material may be different from the first material. The second material may include at least silver.

According to some possible implementations, a method may include depositing a first subset of optical filter layers of the optical filter, the first subset of optical filter layers comprising a first material with a first refractive index, the first material comprising at least silicon and hydrogen; and depositing a second subset of optical filter layers of the optical filter, the second subset of optical filter layers comprising a second material with a second refractive index, and the second material being different from the first material, the second material include at least a metal. The metal could be silver.

According to some possible implementations, an optical system may include an optical filter to filter an input optical signal and provide a filtered input optical signal. The optical filter may include a set of optical filter layers. The set of optical filter layers may include a first subset of optical filter layers include a first material with a first refractive index, the first material including at least silicon and hydrogen. The set of optical filter layers may include a second subset of optical filter layers including a second material with a second refractive index, the second material being different from the first material, the second material including at least silver. The optical system may include an optical receiver to receive the filtered input optical signal and provide an output electrical signal.

BRIEF DESCRIPTION OF THE DRAWINGS

FIGS. 1A-1F are diagrams of an example induced transmission filter, in accordance with various implementations described herein.

FIGS. 2A-2D are diagrams of an example associated with an induced transmission filter, in accordance with various implementations described herein.

DETAILED DESCRIPTION

The following detailed description of example implementations refers to the accompanying drawings. The same reference numbers in different drawings may identify the same or similar elements. The following description uses an optical system, such as a gesture recognition system, a spectrometer, or a health monitoring system, among other examples, as an example. However, the techniques, principles, procedures, and methods described herein may be used with any sensor, including but not limited to other optical sensors and spectral sensors.

An optical receiver may receive light from an optical source, such as an optical transmitter. For example, the optical receiver may receive near infrared (NIR) light from the optical transmitter and reflected off a target. Additionally, or alternatively, the optical receiver may receive another band of light without reflection off a target, such as in a ranging application or a communication application, among other examples. A target may include people (e.g., users and non-users), animals, inanimate objects (e.g., cars or other vehicles, trees, obstacles, furniture, walls), and/or the like. The optical receiver may receive light from the optical transmitter as well as ambient light, such as visible spectrum light. The ambient light may include light from one or more light sources separate from the optical transmitter, such as sunlight, light from a light bulb, and/or the like.

Ambient light may reduce an accuracy of a determination relating to the transmitted light. For example, in a gesture recognition system, ambient light may reduce an accuracy of generation of a three-dimensional image of the target using MR light. In some other examples, the information regarding the MR light may be used to recognize an identity of the user, a characteristic of the user (e.g., a height or a weight), a state of the user (e.g., the position of the user's eyelids, whether the user is awake, and/or the like), a characteristic of another type of target (e.g., a distance to an object, a size of the object, or a shape of the object), and/or the like. In such examples, the presence of ambient light or light with unintended wavelengths may reduce an accuracy of determinations performed using information from the optical receiver. Thus, the optical receiver may be optically coupled to an optical filter, such as a bandpass filter, to filter ambient light and to pass through MR light toward the optical receiver. Although some implementations, are described in terms of optical filters coupled to optical receivers, other implementations may be applicable to light shaping and filter optics coupled to optical transmitters.

FIGS. 1A-1F are diagrams of examples of an induced transmission filter.

Figure 1A:
Figure 1B:
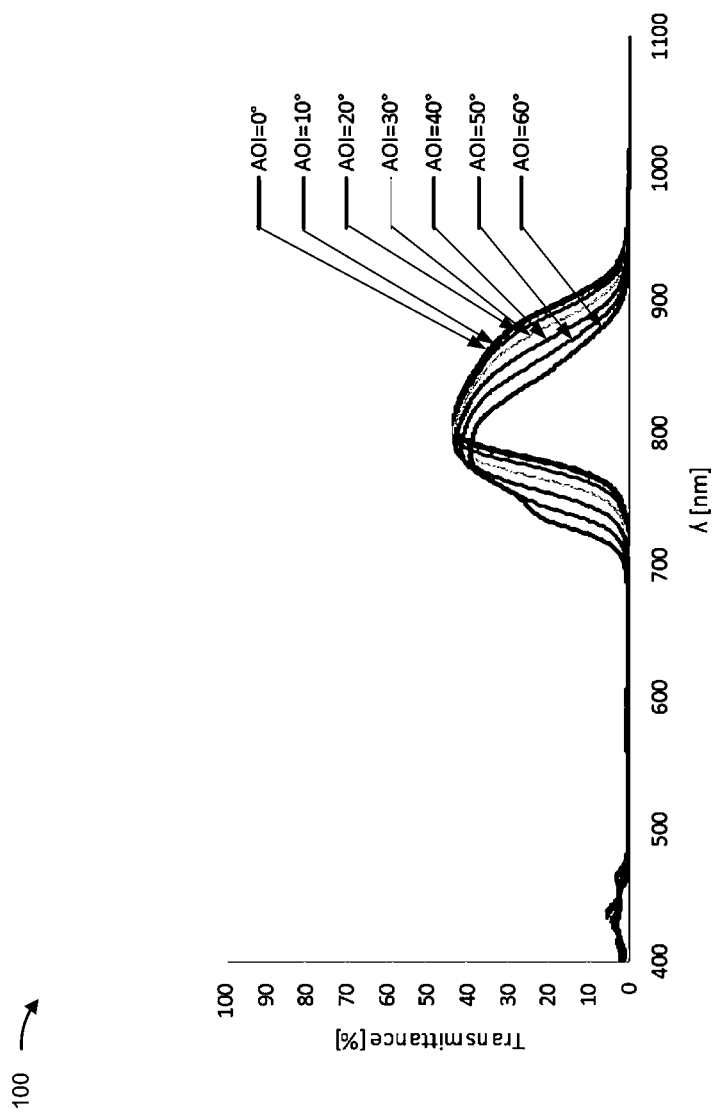
Figure 1C:
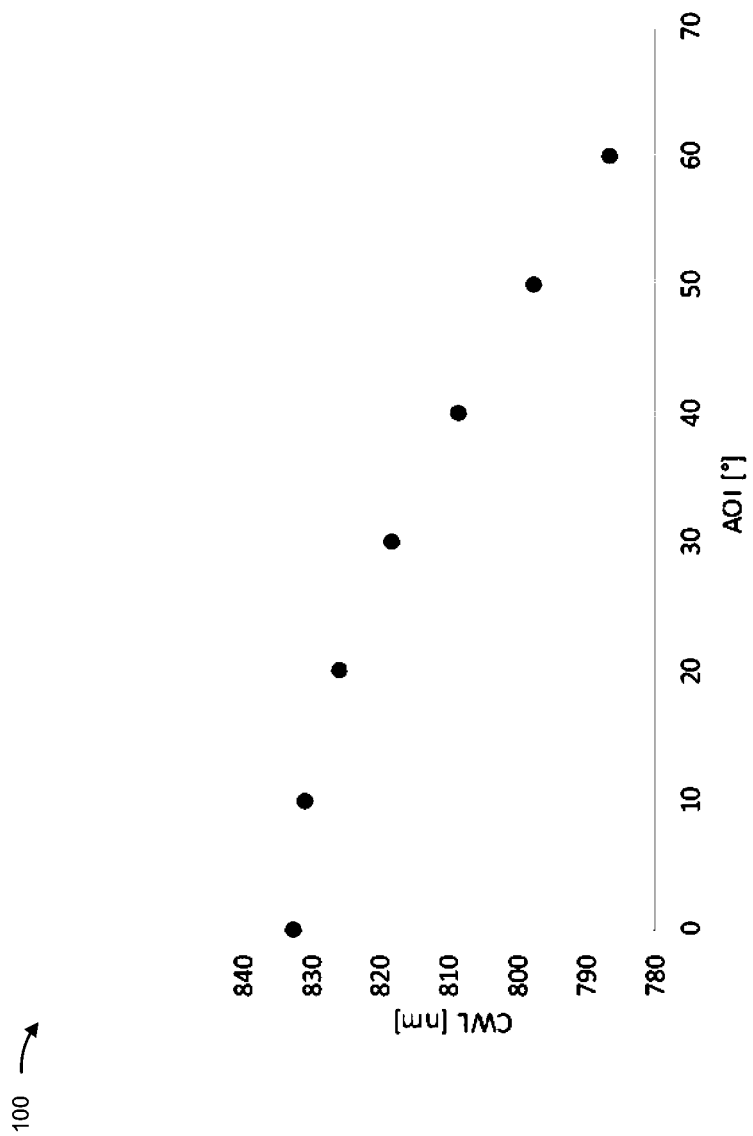

As shown in FIG. 1A, an induced transmission filter (ITF) bandpass filter 100 may include a first set of filter layers with a first material (e.g., silver (Ag)) and a second set of filter layers with a second material (e.g., niobium titanium oxide (NbTiOx)). The first material and the second material may be selected to achieve out-of-band blocking at a particular spectral range. In other words, the first material and the second material (and a quantity of layers and thickness of layers thereof) are selected to enable a first band of light to pass through and to block a second band of light, thereby enabling sensing of the first band of light, without negative performance caused by unintended wavelengths in the second band of light. For some sensing use cases, silver may be selected as the first material and an oxide (NbTiOx, as shown) may be selected as a second refractive material. However, silver may be reactive with the oxide, which may result in a negative impact to optical properties of a filter including silver and the oxide. Adding a third material, such as zinc oxide (ZnO), as shown, as a buffer layer may reduce reactivity between the silver and the oxide. As shown in FIGS. 1B and 1C, the ITF bandpass filter 100 may have a transmittance of approximately 40-45% at a center wavelength of 820 nanometers (nm), and an angle shift of approximately 46 nm at angles of incidence up to 60 degrees. Further, as shown in 1B, there may be leakage (unintended transmittance) at a first harmonic (e.g., at between approximately 400 nm and 470 nm) of the center wavelength of ITF bandpass filter 100, which may result in poor optical performance.

Figure 1E:
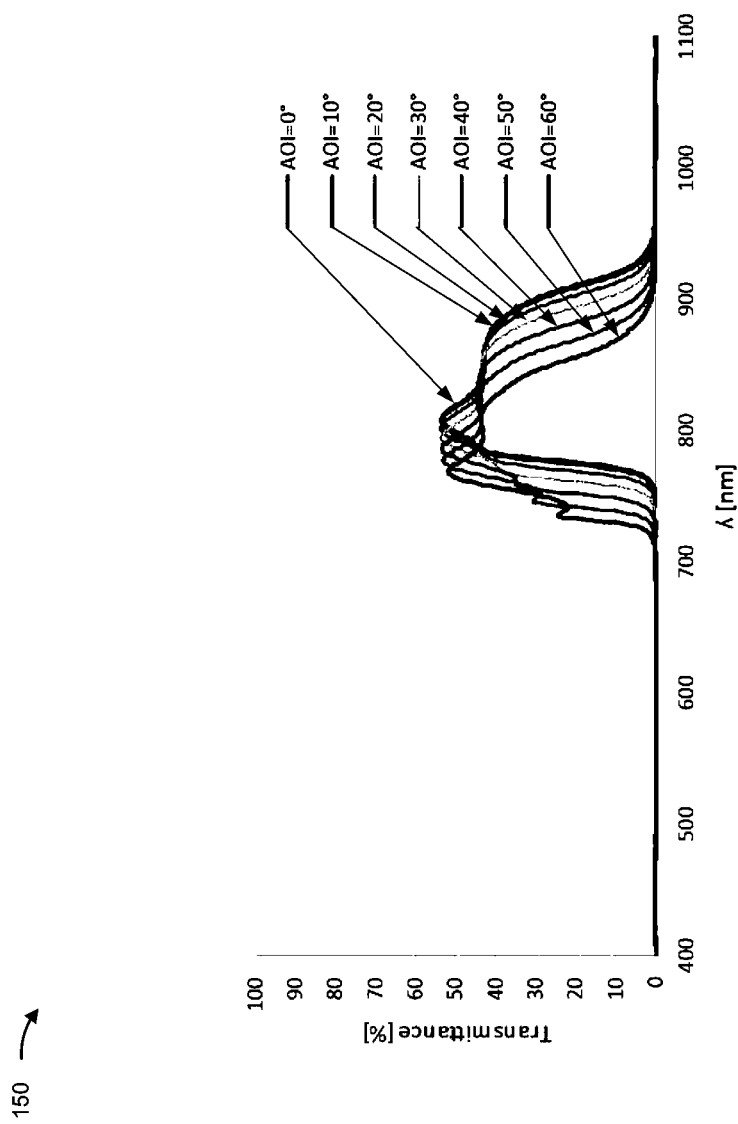

As shown in FIGS. 1D-1F, further adding a dielectric stack of a high refractive index material (a fourth material), such as amorphous silicon (a-Si), and a low refractive index material (a fifth material), such as silicon dioxide ($SiO_2$) may further improve optical performance of an ITF bandpass filter 150 that includes silver and an oxide. For example, as shown in FIGS. 1E and 1F, ITF bandpass filter 150 may have a transmittance of approximately 53%, may eliminate leakage (unintended transmittance) at approximately 450 nm, which occurs for the ITF bandpass filter 100, and may slightly reduce angle shift at an angle of incidence of 60 degrees to 40 nm.

As indicated above, FIGS. 1A-1F are provided as an example. Other examples may differ from what is described with regard to FIGS. 1A-1F.

However, adding the third material, the fourth material, and the fifth material, may result in difficulties in manufacturing an optical filter. For example, some deposition systems limit a quantity of materials that can be deposited to no more than 2 materials or no more than 3 materials. Thus, manufacturing an optical filter that includes 3, 4, 5, or even more materials may require multiple deposition runs, which may be costly and may waste time. Furthermore, the aforementioned optical filters may have a relatively large angle shifts.

Thus, some implementations described herein may utilize a non-oxide material to pair with, for example, silver in an ITF bandpass filter. For example, an ITF bandpass filter may include a first set of layers of silver and a second set of layers of, for example, hydrogenated silicon (Si:H), hydrogenated silicon germanium (SiGe—H), hydrogenated germanium (Ge—H), among other examples. Replacing the oxide layers with, for example, hydrogenated silicon obviates a need for a protection layer (e.g., ZnO) to avoid reactivity between silver and an oxide. Moreover, because hydrogenated silicon can be sputtered from a silicon target, which may also sputter silicon dioxide, an ITF bandpass filter including layer of, for example, amorphous silicon, silver, and silicon dioxide may be sputtered using a single sputtering procedure. Furthermore, an ITF bandpass filter manufactured using silver, hydrogenated silicon, and silicon dioxide may achieve a reduced angle shift and an improved transmissivity relative to the aforementioned ITF bandpass filters 100 and 150.

FIGS. 2A-2D are diagrams of an example associated with an ITF bandpass filter.

Figure 2B:
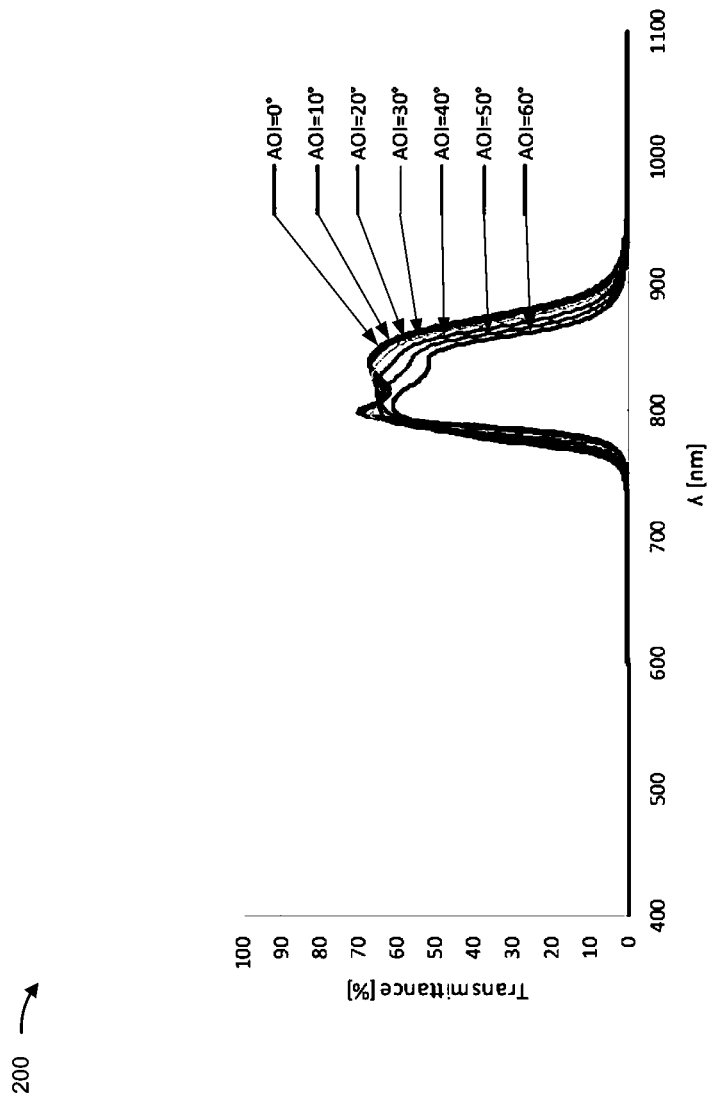
Figure 2C:
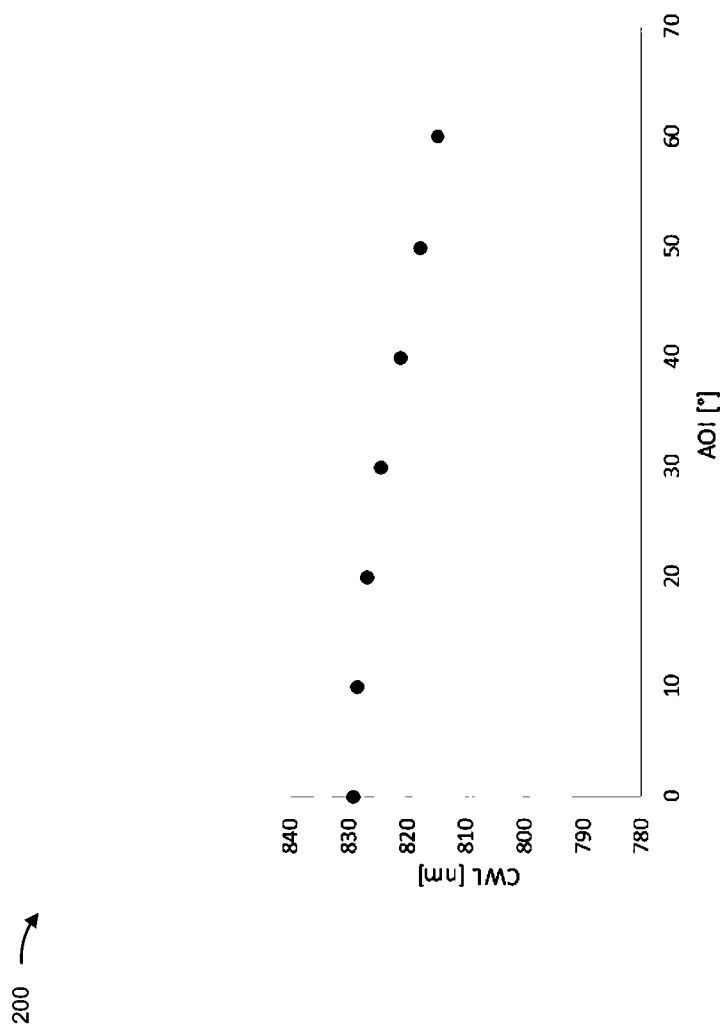
Figure 2D:
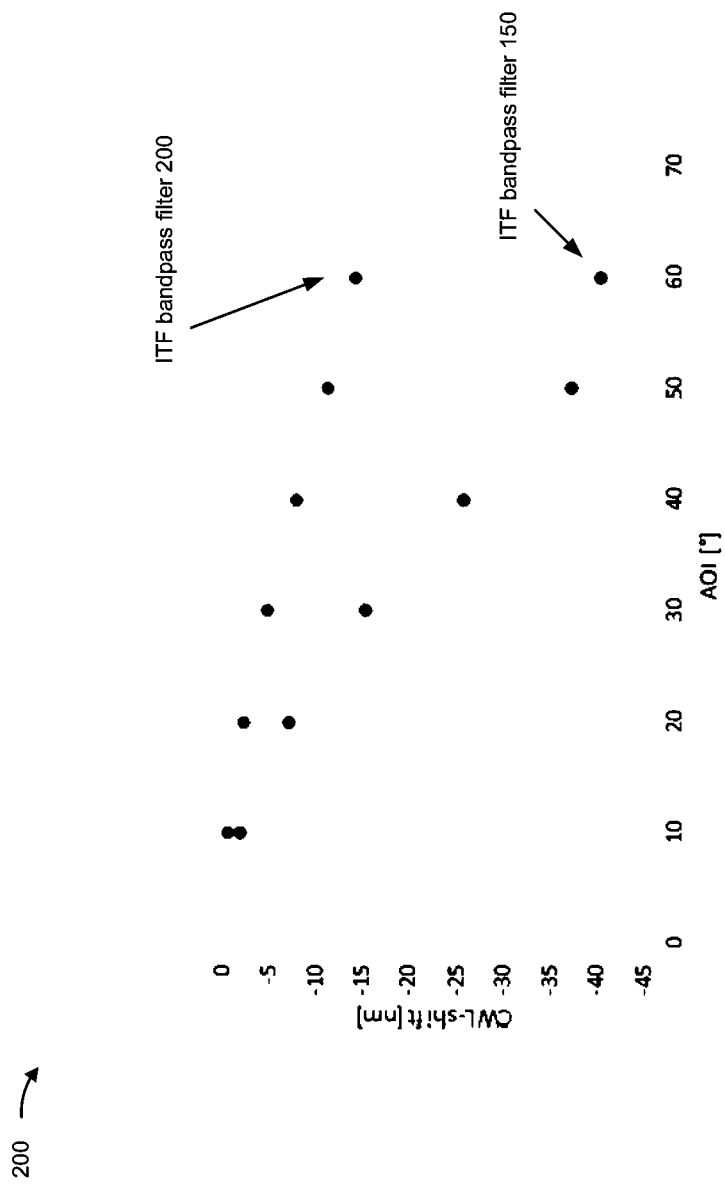

As shown in FIG. 2A, an ITF bandpass filter 200 may include alternating layers of silver and amorphous silicon, as well as a dielectric stack formed from alternating layers of silicon dioxide and amorphous silicon. In this case, as shown in FIGS. 2B-2D, the ITF bandpass filter 200, at a center wavelength of approximately 820 nm, achieves improved transmittance (e.g., greater than 60% and between approximately 65-70% at the center wavelength) and reduced angle shift (e.g., reduced from 26 nm to 8.1 nm at a 40 degree angle of incidence) relative to ITF bandpass filters 100 and 150. Moreover, the ITF bandpass filter 200 suppresses the aforementioned leakage at 450 nm, thereby improving optical performance relative to the ITF bandpass filter 100. In this way, use of, for example, amorphous silicon rather than an oxide layer to pair with silver results in improved optical performance with a reduced quantity of materials, thereby improving manufacturability, as described in more detail herein. Furthermore, ITF bandpass filter 200 is, at 626.8 nm, approximately half as thick as, for example, ITF bandpass filter 150 (1265.6 nm thickness), thereby enabling improved miniaturization of optical systems, reduced cost, and/or the like.

As indicated above, FIGS. 2A-2D are provided as an example. Other examples may differ from what is described with regard to FIGS. 2A-2D. The number and arrangement of devices shown in FIGS. 2A-2D are provided as an example.

FIGS. 3A-3D are diagrams of examples associated with an ITF bandpass filter.

Figure 3A:
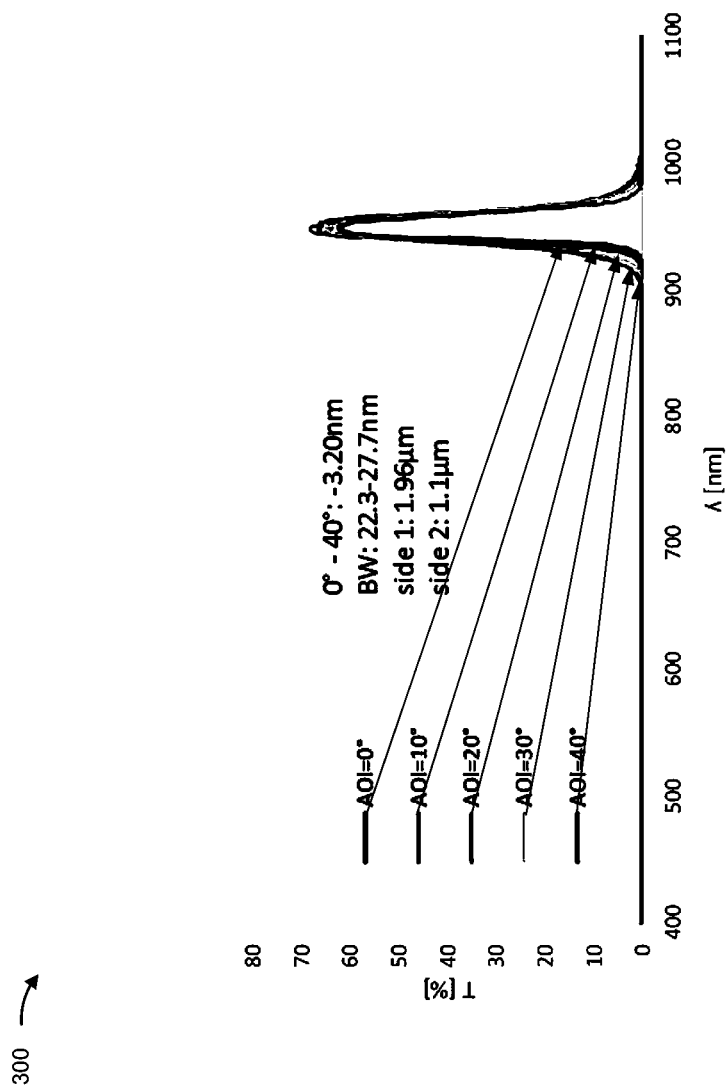
FIGS. 3A-3D are diagrams of an example associated with an induced transmission filter, in accordance with various implementations described herein.
Figure 3B:
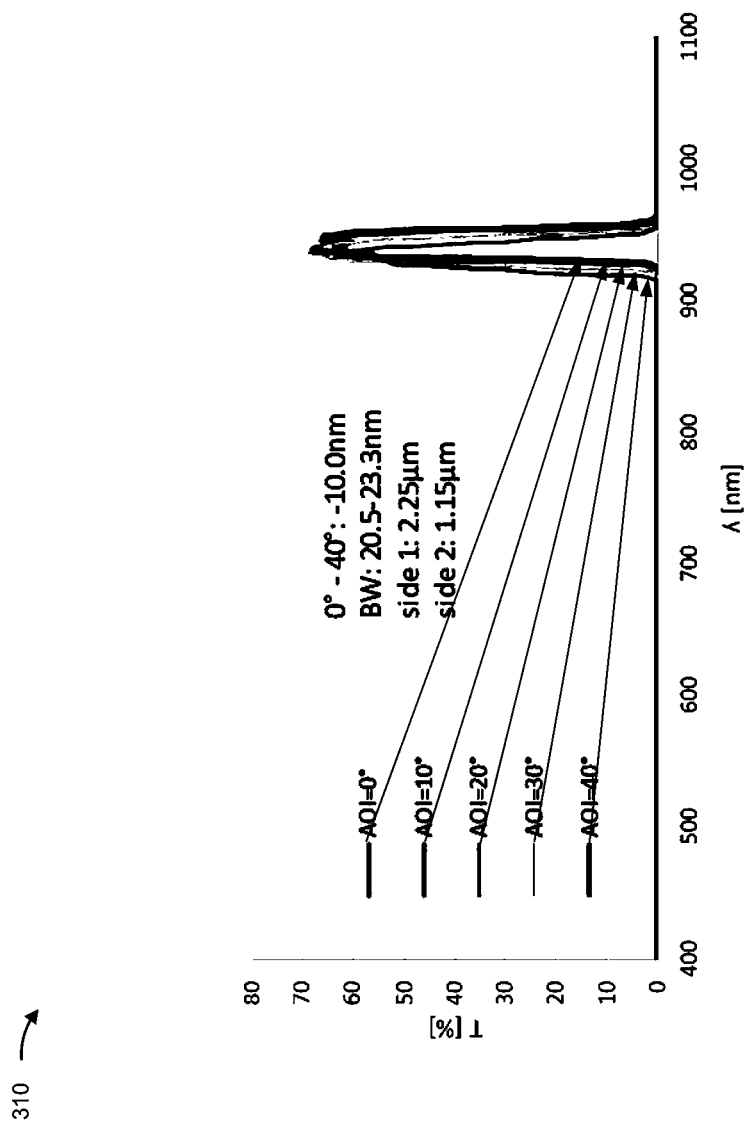

As shown in FIG. 3A, an ITF bandpass filter 300 may be configured to achieve a low angle shift at a center wavelength of 950 nm (and with collimated light). ITF bandpass filter 300 may include a 1.96 micrometer (μm) thickness coating of filter layers on a first side of a substrate and a 1.1 μm thickness coating of filter layers on a second side of the substrate. In this case, a bandwidth of ITF bandpass filter 300 may be between approximately 22.3 nm and 22.7 nm, and an angle shift may be approximately 3.2 nm (−3.2 nm relative to the center wavelength) at an angle of incidence of 40 degrees. As shown in FIG. 3B, an ITF bandpass filter 310 may be configured to achieve a low angle shift at a center wavelength of 940 nm (and with collimated light). ITF bandpass filter 310 may include a 2.25 μm thickness coating of filter layers on a first side of a substrate and a 1.15 μm thickness coating of filter layers on a second side of the substrate. In this case, a bandwidth of ITF bandpass filter 310 may be between approximately 20.5 nm and 23.3 nm, and an angle shift may be approximately 10.0 nm (−10.0 nm relative to the center wavelength) at an angle of incidence of 40 degrees.

Figure 3C:
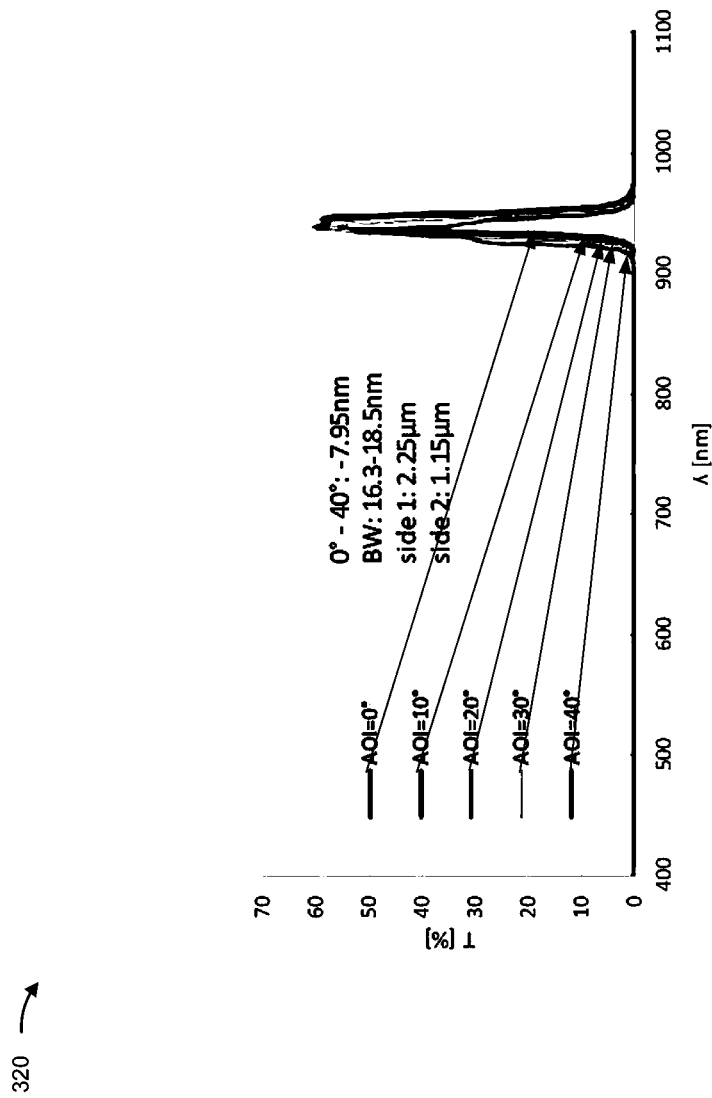
Figure 3D:
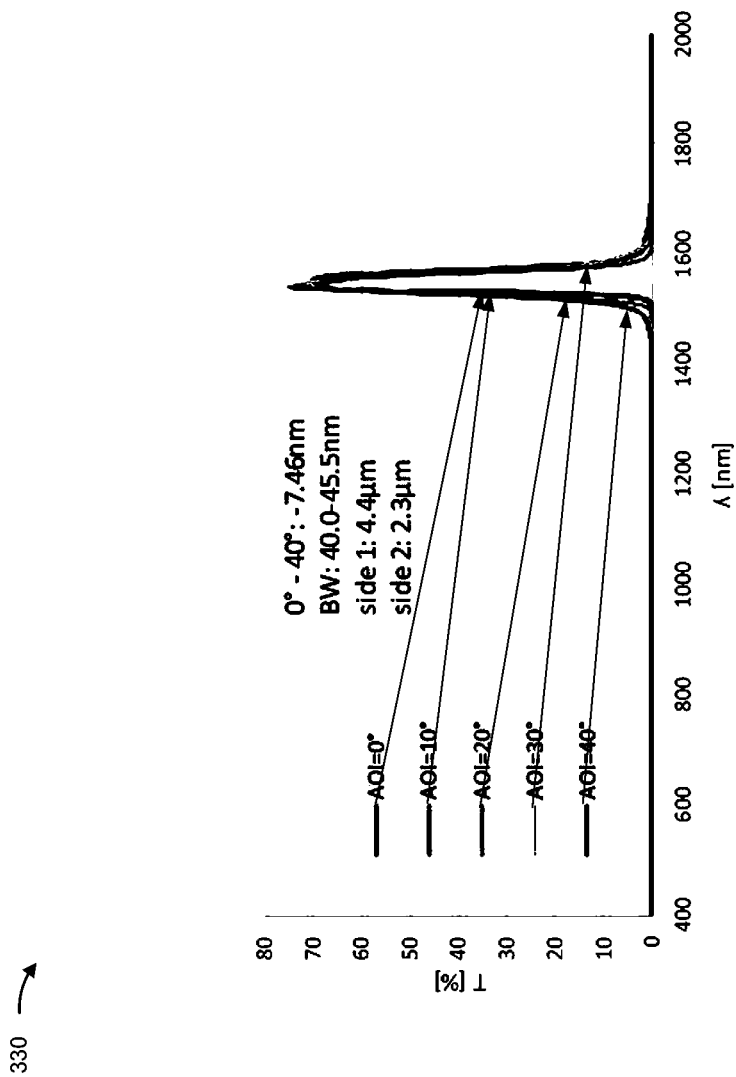

As shown in FIG. 3C, an ITF bandpass filter 320 may be configured to achieve a low angle shift at a center wavelength of 940 nm (and with collimated light), but with a narrower bandwidth relative to ITF bandpass filters 300 and 310. ITF bandpass filter 320 may include a 2.25 μm thickness coating of filter layers on a first side of a substrate and a 1.15 μm thickness coating of filter layers on a second side of the substrate. In this case, a bandwidth of ITF bandpass filter 320 may be between approximately 16.3 nm and 18.5 nm, and an angle shift may be approximately 7.95 nm (−7.95 nm relative to the center wavelength) at an angle of incidence of 40 degrees. As shown in FIG. 3D, an ITF bandpass filter 330 may be configured to achieve a low angle shift at a center wavelength of 1550 nm (and with collimated light). ITF bandpass filter 330 may include a 4.4 μm thickness coating of filter layers on a first side of a substrate and a 2.3 μm thickness coating of filter layers on a second side of the substrate. In this case, a bandwidth of ITF bandpass filter 330 may be between approximately 40.0 nm and 45.5 nm, and an angle shift may be approximately 7.46 nm (−7.46 nm relative to the center wavelength) at an angle of incidence of 40 degrees.

As indicated above, FIGS. 3A-3D are provided as an example. Other examples may differ from what is described with regard to FIGS. 3A-3D. The number and arrangement of devices shown in FIGS. 3A-3D are provided as an example.

Figure 4:
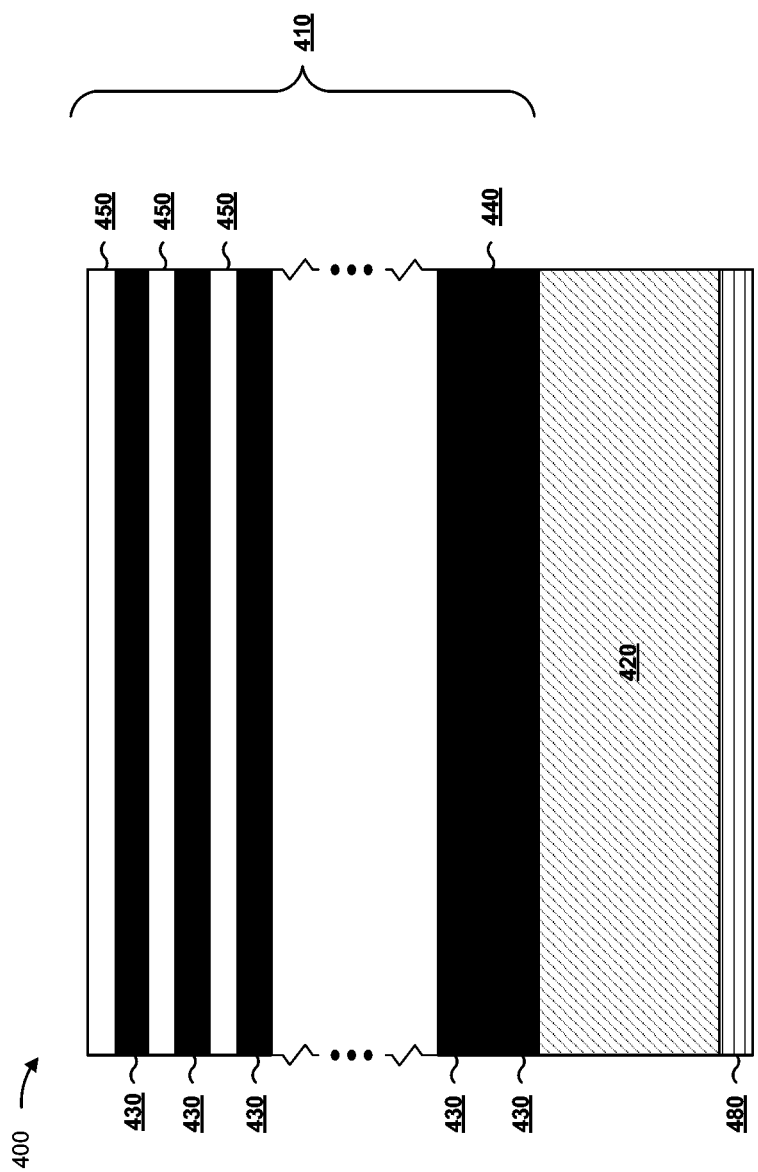
FIG. 4 is a diagram of an example associated with a set of optical filter layers of an induced transmission filter, in accordance with various implementations described herein.

FIG. 4 is a diagram of an example optical filter 400. As further shown in FIG. 4, optical filter 400 may include an optical filter coating portion 410 and a substrate 420.

As shown in FIG. 4, optical filter coating portion 410 includes a set of optical filter layers. For example, optical filter coating portion 410 includes a first set of layers 430, a second set of layers 440, and, in some implementations, a third set of layers 450. The first set of layers 430 may include a set of layers of a high refractive index material and may be referred to herein as H layers 430. For example, in some implementations, the H layers 430 may include materials comprising hydrogen and silicon (e.g., hydrogenated silicon (Si:H) layers that may include silicon (Si) and hydrogen (H), hydrogenated silicon-germanium (SiGe:H) layers, and/or the like). In some implementations, the H layers 430 may include materials comprising silicon and germanium (e.g., silicon-germanium (SiGe) layers and/or the like).

These high refractive index materials may have a refractive index higher than 3, 3.2, 3.5, 3.6, 4, and/or the like over a range of at least 800 nanometers (nm) to 1700 nm. For example, Si:H may have a refractive index of greater than 3 over the wavelength range of 800 nm to 1700 nm. In some implementations, the Si:H material has a refractive index of greater than 3.5 over the wavelength range of 800 nm to 1100 nm, (e.g., a refractive index of greater than 3.64). In some implementations, the Si:H material may have a refractive index of approximately 3.8 at a wavelength of approximately 830 nm. In some implementations, the refractive index may be greater than 3.87 at 800 nm. In some implementations, the Si:H material has a refractive index of less than 4.3 over the wavelength range of 800 nm to 1700 nm. The high refractive index layers may include phosphorous, boron, nitride, argon, oxygen, carbide, and/or the like.

In some implementations, the second set of layers 440 may include a set of layers of metal layers and may be referred to herein as M layers 440. In some implementations, the M layers 440 may include silver. In some implementations, each M layer 440 may be sandwiched by a set of H layers 430. In some implementations, optical filter coating portion 410 may include multiple sets of M layers 440 (e.g., a first M layer 440 sandwiched by a first pair of H layers 430 and a second M layer 440 sandwiched by a second pair of H layers 430). In some implementations, an H layer 430 may be disposed between two M layers 440. For example, a first H layer 430 and a second H layer 430 may sandwich a first M layer 440 and the second H layer 430 and a third H layer 430 may sandwich a second M layer 440. Additionally, or alternatively, one or more intermediate layers may be disposed between a first set of H layers 430 sandwiching a first M layer 440 and a second set of H layers 430 sandwiching a second M layer 440.

In some implementations, the third set of layers 450 may include a set low refractive index material layers, such as silicon dioxide or another material. For example, the refractive index of the L layers 450 is generally lower than the refractive index of the H layers 430. In this case, one or more alternating H layers 430 and L layers 450 may improve a performance of an optical filter that includes H layers 430 and M layers 440 by, for example, controlling one or more optical characteristics of the optical filter.

The quantity, thickness, and/or order of the layers may affect optical quality of optical filter coating portion 410 and/or optical filter 400 including the optical transmission and angle shift. In some implementations, optical filter coating portion 410 may be associated with a particular quantity of layers, m. For example, optical filter coating portion 410 may include 2 to 200 layers, 3 to 100 layers, or 5 to 21 layers. Optical filter coating portion 410 may include 3 to 40 H layers 430.

In some implementations, each layer of optical filter coating portion 410 may be associated with a particular thickness. For example, layers 430, 440, and/or 450 may each be associated with a thickness of between 1 nm and 1500 nm, 3 nm and 1000 nm, 6 nm and 1000 nm, or 10 nm and 500 nm, and/or optical filter coating portion 410 may be associated with a thickness of between 0.1 μm and 100 μm, 0.25 μm and 20 μm, and/or the like. In this case, M layer 440 may have a thickness of between approximately 10 nm and 60 nm. In some examples, at least one of layers 430, 440, and 450 may be associated with a thickness of less than 1000 nm, less than 600 nm, less than 100 nm, or less than 20 nm, and/or optical filter coating portion 110 may be associated with a thickness of less than 100 μm, less than 50 μm, less than 10 μm, and/or less than 3 μm. In some implementations, layers 430, 440, and/or 450 may be associated with multiple thicknesses, such as a first thickness for layers 430 and a second thickness for layers 440, a first thickness for a first subset of layers 430 and a second thickness for a second subset of layers 430, a first thickness for a first subset of layers 440 and a second thickness for a second subset of layers 440, and/or the like. In this case, a layer thickness and/or a quantity of layers may be selected based on an intended set of optical characteristics, such as an intended passband, an intended reflectance, and/or the like.

In some implementations, a particular SiGe based material may be selected for the H layers 430. For example, in some implementations, H layers 430 may be selected and/or manufactured (e.g., via a sputtering procedure, as described in further detail below) to include a particular type of SiGe, such as SiGe-50, SiGe-40, SiGe-60, and/or the like. Additionally, or alternatively, Si:H, SiGe—H, or Ge—H may be selected for H layers 430.

In some implementations, H layers 430 may include another material, such as argon, as a result of a sputter deposition procedure, as described herein. In another example, the H layers 430 may be manufactured using a hydrogenating procedure to hydrogenate a silicon or SiGe based material, a nitrogenating procedure to nitrogenate the silicon or SiGe based material, one or more annealing procedures to anneal the silicon or SiGe based material, another type of procedure, a doping procedure (e.g., phosphorous based doping, nitrogen based doping, boron based doping, and/or the like) to dope the silicon or SiGe based material, or a combination of multiple procedures (e.g., a combination of hydrogenation, nitrogenation, annealing, and/or doping), as described herein.

In some implementations, optical filter 400 may include a coating 480 on the opposite side of the substrate from optical filter coating portion 410. Coating 480 may be a single layer or multiple layers. In some examples, coating 480 may be an anti-reflective coating, a blocking filter, and/or bandpass filter. Coating 480 may include at least one of an oxide, including $SiO_x$, $SiO_2$, $TiO_2$, $Ta_2O_5$, and/or the like. In one example, coating 480 may be alternating layers of $SiO_2$ and amorphous silicon. Additionally, or alternatively, coating 480 may have a similar structure as optical filter coating portion 410 and may include more than two materials. In some implementations, materials of coating 480 may be selected to enable fabrication using a single sputter deposition cycle, such as selection silicon dioxide for sputtering using the same deposition cycle as is used to sputter hydrogenated silicon for optical filter coating portion 410.

Optical filter coating portion 410 may be fabricated by any method, including but not limited to any coating and/or sputtering process. For example, the optical filter coating portion 410 as shown may be fabricated by depositing an H layer 430 on substrate 420, then an M layer 440 may then be deposited on the H layer 430, and a second H layer 430 may then be deposited on the M layer 440. Subsequently, the same sputter deposition procedure may be used to deposit one or more L layers 450, as described in more detail herein. This may be repeated until the desired quantity of layers is deposited. In some cases, there may be other materials in one or more of the layers 430, 440, 450, and/or the like. For example, during deposition processes, materials used to form a deposited layer may bleed into an underlying layer. In some implementations, optical filter coating portion 410 may be fabricated using a sputtering procedure. For example, optical filter coating portion 410 may be fabricated using a pulsed-magnetron based sputtering procedure on the substrate 420, which may be a glass substrate or another type of substrate.

In some implementations, multiple cathodes may be used for the sputtering procedure, such as a first cathode to sputter silicon and a second cathode to sputter germanium. In this case, the multiple cathodes may be associated with an angle of tilt of the first cathode relative to the second cathode selected to ensure a particular concentration of germanium relative to silicon, as described below. In some implementations, hydrogen flow may be added during the sputtering procedure to hydrogenate the silicon or silicon-germanium. Similarly, nitrogen flow may be added during the sputtering procedure to nitrogenate the silicon or silicon-germanium.

In some implementations, optical filter coating portion 410 may be annealed using one or more annealing procedures, such as a first annealing procedure at a temperature of approximately 280 degrees Celsius or between approximately 200 degrees Celsius and approximately 400 degrees Celsius, a second annealing procedure at a temperature of approximately 320 degrees Celsius or between approximately 250 degrees Celsius and approximately 350 degrees Celsius, and/or the like. In some implementations, optical filter coating portion 410 may be fabricated using a SiGe:H coated from a target.

In some implementations, optical filter coating portion 410 is attached to a substrate, such as substrate 420. For example, optical filter coating portion 410 may be attached to a glass substrate or another type of substrate. Additionally, or alternatively, optical filter coating portion 410 may be coated directly onto a detector or onto a set of silicon wafers including an array of detectors (e.g., using photo-lithography, a lift-off process, and/or the like). In some implementations, optical filter coating portion 410 may be associated with an incident medium. For example, optical filter coating portion 410 may be associated with an air medium or a glass medium as an incident medium. In some implementations, optical filter 400 may be disposed between a set of prisms. In another example, another incident medium may be used, such as a transparent epoxy, and/or another substrate may be used, such as a polymer substrate (e.g., a polycarbonate substrate, a cyclic olefin copolymer (COP) substrate, and/or the like).

In some implementations, optical filter 400 may have a low center wavelength shift with a change in incidence angle. The center wavelength of the passband shifts by less than 15 nm in magnitude with a change in incidence angle from 0° to 60°. In some examples, the center wavelength of the passband may shift less than 5 nm in magnitude with a change in incidence angle from 0° to 40°.

As indicated above, FIG. 4 is provided merely as an example. Other examples may differ from what is described with regard to FIG. 4.

FIGS. 5A-5D are diagrams of one or more examples 500 of sputter deposition systems for manufacturing one or more example implementations described herein.

Figure 5A:
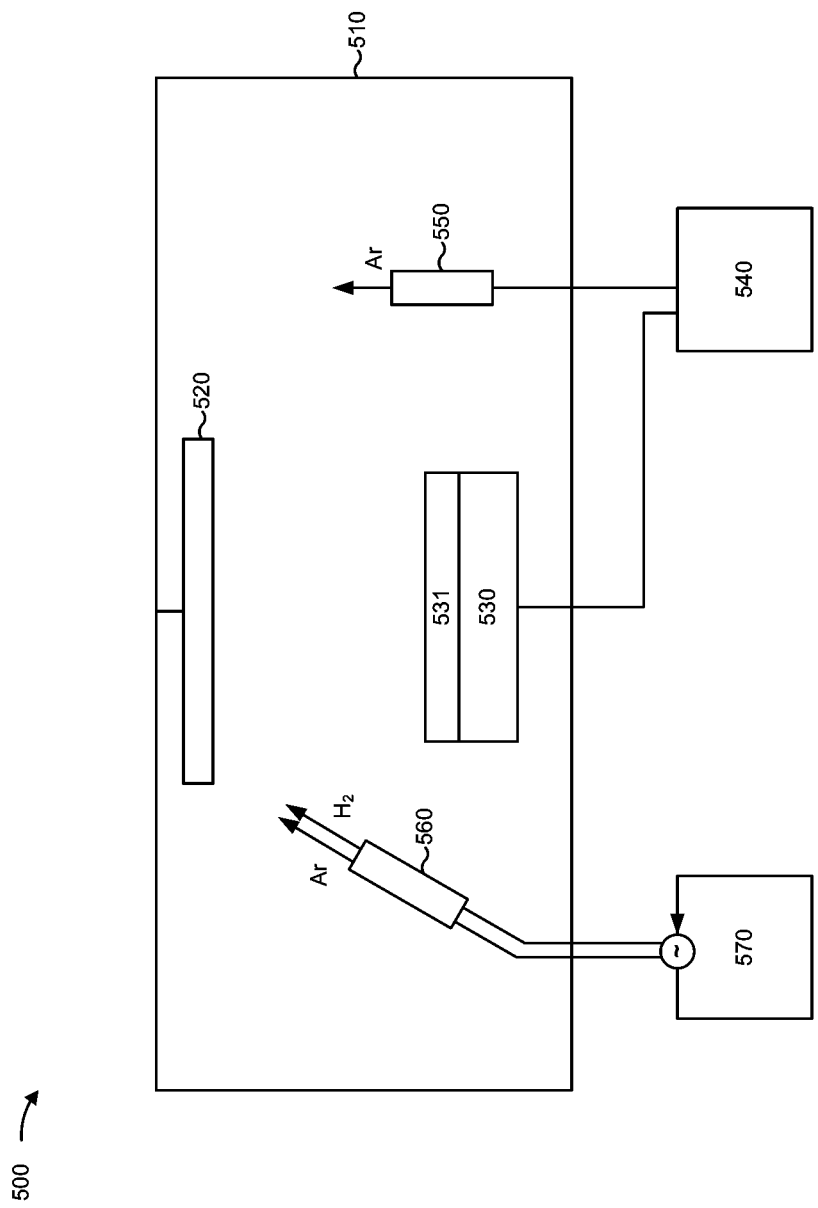
FIGS. 5A-5D are diagrams of an example associated with a sputtering system for depositing a set of optical filter layers, in accordance with various implementations described herein.

As shown in FIG. 5A, an example sputter deposition system may include a vacuum chamber 510, a substrate 520, a cathode 530, a target 531, a cathode power supply 540, an anode 550, a plasma activation source (PAS) 560, and a PAS power supply 570. Target 531 may include a silicon material, a silicon-germanium material in a particular concentration selected based on optical characteristics of the particular concentration, and/or the like. In another example, an angle of cathode 530 may be configured to cause a particular concentration of silver, silicon, and/or silicon-germanium to be sputtered onto substrate 520, as described herein. PAS power supply 570 may be utilized to power PAS 560 and may include a radio frequency (RF) power supply. Cathode power supply 540 may be utilized to power cathode 530 and may include a pulsed direct current (DC) power supply. In this case, the sputter deposition system may cause one or more layers to be sputtered onto substrate 520 through DC sputtering.

As shown in FIG. 5A, target 531 may be sputtered in the presence of hydrogen ($H_2$), as well as an inert gas, such as argon, to deposit a silver material, a hydrogenated silicon (Si:H) material, a hydrogenated silicon-germanium (SiGe:H) material, a silicon dioxide material ($SiO_2$), and/or the like as a layer on substrate 520. For example, target 531 (and another target, as described herein) may deposit alternating layers of silver and hydrogenated silicon on a first side of substrate 520 (e.g., to form an ITF bandpass filter) and alternating layers of silicon dioxide and hydrogenated silicon on a second side of substrate 520 (e.g., to control optical performance of the ITF bandpass filter, as described above).

The inert gas may be provided into the chamber via anode 550 and/or PAS 560. Hydrogen is introduced into the vacuum chamber 510 through PAS 560, which serves to activate the hydrogen. Additionally, or alternatively, cathode 530 may cause hydrogen activation, in which case the hydrogen may be introduced from another part vacuum chamber 510, or anode 550 may cause hydrogen activation, in which case anode 550 may introduce the hydrogen into vacuum chamber 510. In some implementations, the hydrogen may take the form of hydrogen gas, a mixture of hydrogen gas and a noble gas (e.g., argon gas), and/or the like. PAS 560 may be located within a threshold proximity of cathode 530, allowing plasma from PAS 560 and plasma from cathode 530 to overlap. The use of PAS 560 may allow the Si:H and/or SiGe:H layer to be deposited at a relatively high deposition rate. In some implementations, the Si:H and/or SiGe:H layer is deposited at a deposition rate of approximately 0.05 nm/s to approximately 2.0 nm/s, at a deposition rate of approximately 0.5 nm/s to approximately 1.2 nm/s, at a deposition rate of approximately 0.8 nm/s, and/or the like.

Although the sputtering procedure is described herein in terms of a particular geometry and a particular implementation, other geometries and other implementations are possible. For example, hydrogen may be injected from another direction, from a gas manifold in a threshold proximity to cathode 530, and/or the like.

Figure 5B:
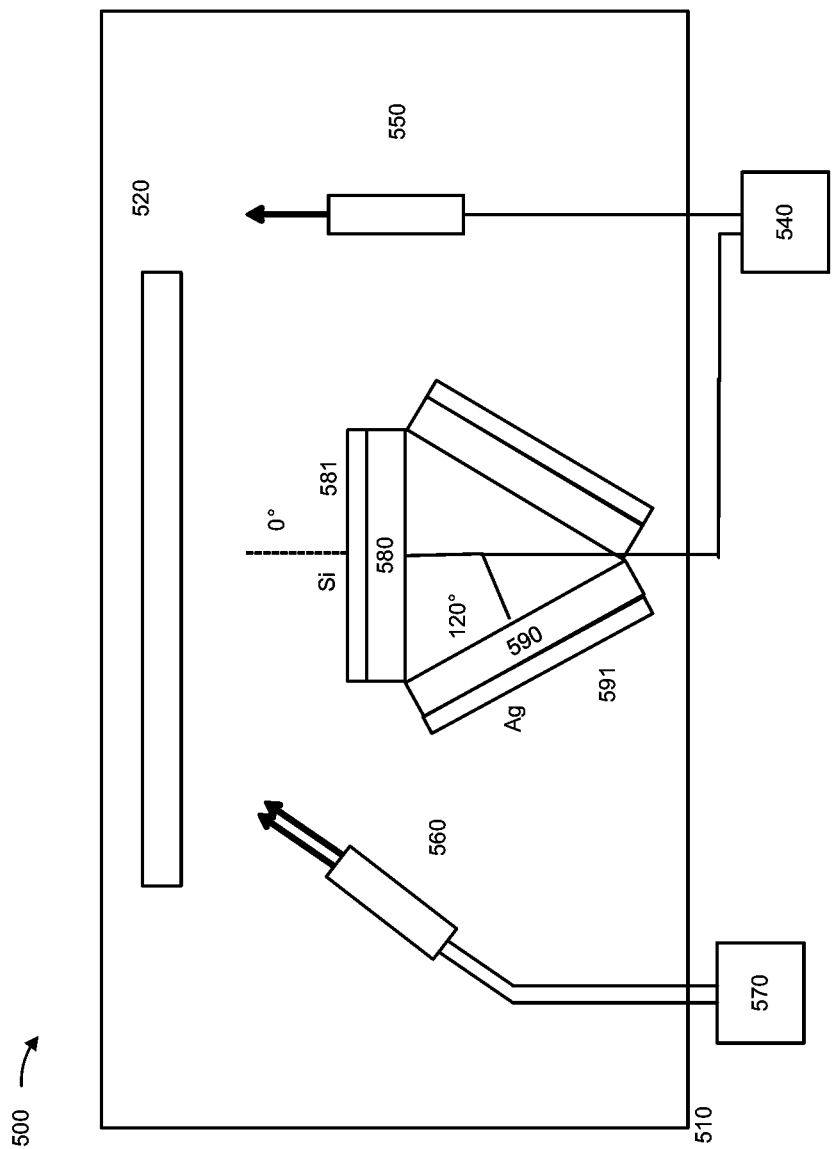
Figure 5C:
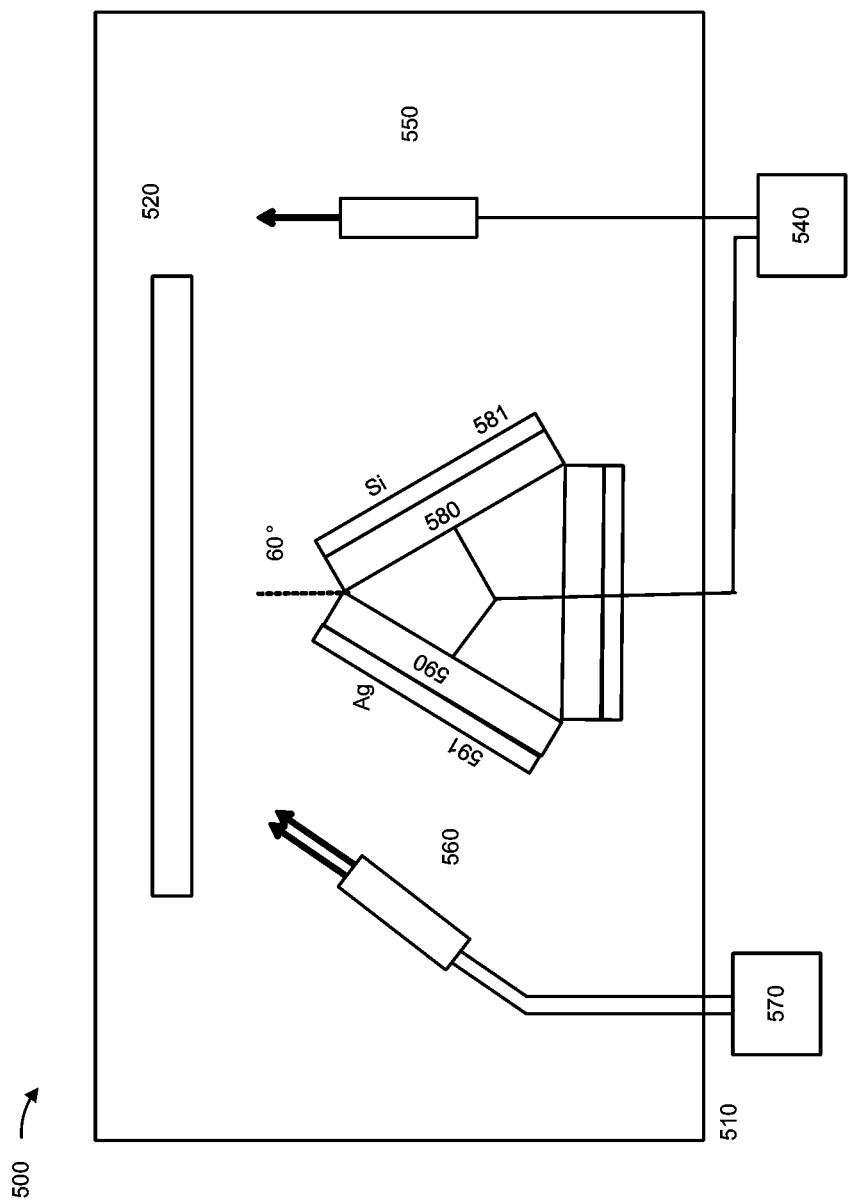

As shown in FIGS. 5B-5C, a similar sputter deposition system includes a vacuum chamber 510, a substrate 520, a first cathode 580, a second cathode 590, a first target 581, a second target 591, a cathode power supply 540, an anode 550, a PAS 560, and a PAS power supply 570. In this case, the first target 581 may be a silicon target and the second target 591 may be a silver target. Accordingly, as described herein, the first target 581 may be referred to as silicon target 581 and the second target 591 may be referred to as silver target 591. However, it will be appreciated that that the first target 581 and/or the second target 591 may be made from other suitable materials to form filter layers.

As shown in FIG. 5B, silicon target 581 is oriented at approximately 0 degrees relative to substrate 520 (e.g., approximately parallel to substrate 520) and silver target 591 is oriented at approximately 120 degrees relative to substrate 520. In this case, silicon and silver are sputtered by cathode 580 and cathode 590, respectively from silicon target 581 and silver target 591, respectively, onto substrate 520. In this case, using two targets 581 and 591, fabrication of an ITF bandpass filter, such as ITF bandpass filter 200, can be completed without requiring opening of a vacuum provided by the sputter deposition system to change the target's materials, thereby reducing an amount of time for fabrication.

As shown in FIG. 5C, in a similar sputter deposition system, silicon target 581 and silver target 591 are each oriented at approximately 60 degrees relative to substrate 520, and silicon and silver are sputtered by cathode 580 and cathode 590, respectively, from silicon target 581 and silver target 591, respectively, onto substrate 520.

Figure 5D:
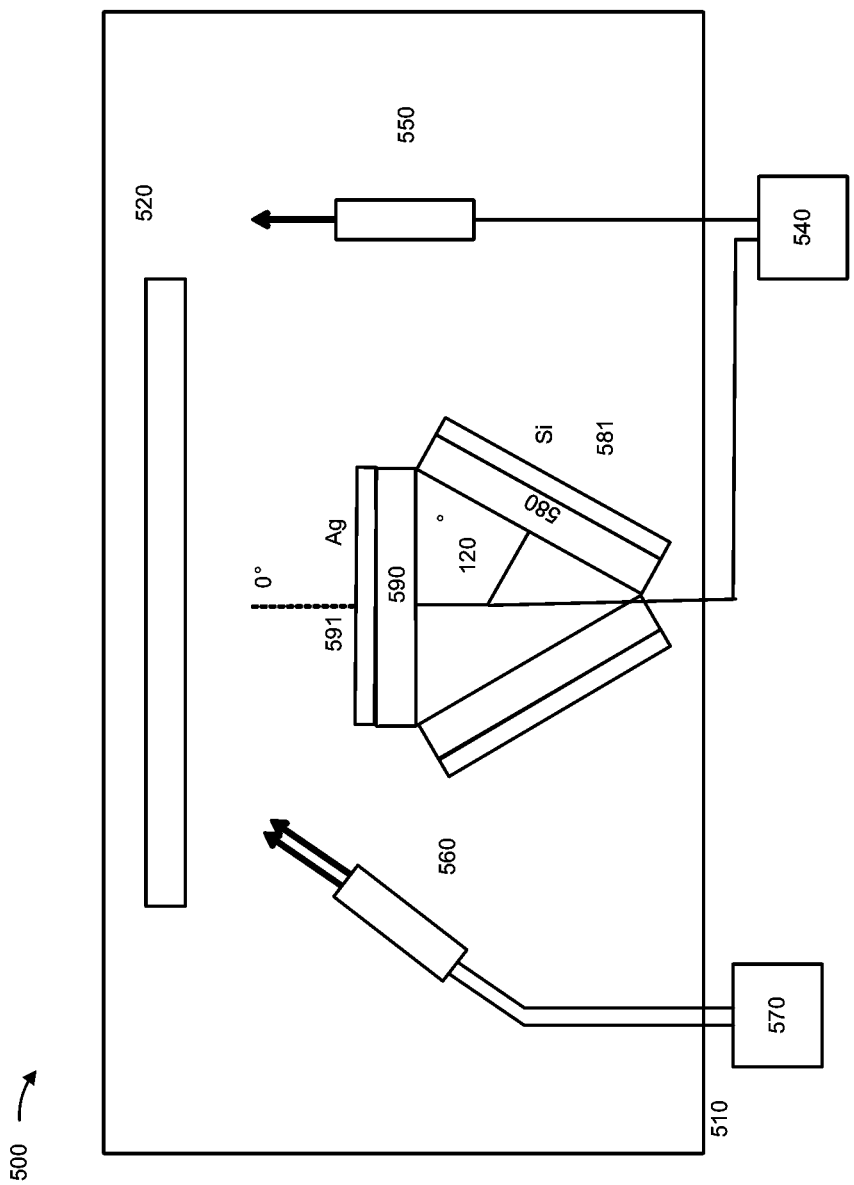

As shown in FIG. 5D, in a similar sputter deposition system, silicon target 581 is oriented at approximately 120 degrees relative to substrate 520 and silver target 591 is oriented at approximately 0 degrees relative to substrate 520. In this case, silicon and germanium are sputtered by cathode 580 and cathode 590, respectively from silicon target 581 and silver target 591, respectively, onto substrate 520.

With regard to FIGS. 5A-5D, each configuration of components in a silicon sputter deposition system may result in a different relative concentration of silicon, silicon and silver, and/or the like. Although described herein in terms of different configurations of components, different relative concentrations of silicon and germanium may also be achieved using different materials, different manufacturing processes, and/or the like.

As indicated above, FIGS. 5A-5D are provided merely as one or more examples. Other examples may differ from what is described with regard to FIGS. 5A-5D.

Figure 6A:
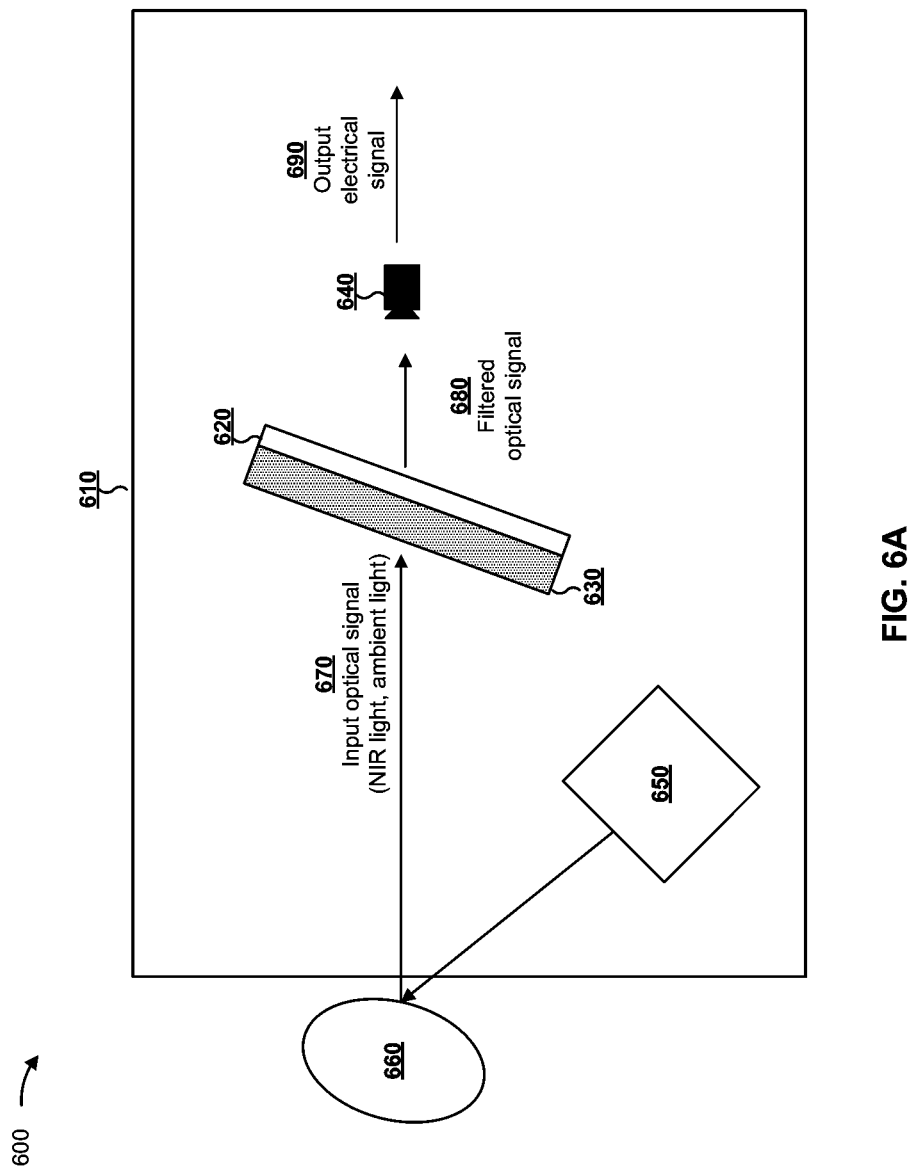
FIGS. 6A-6B are diagrams of an example associated with an optical system including an induced transmission filter, in accordance with various implementations described herein.
Figure 6B:
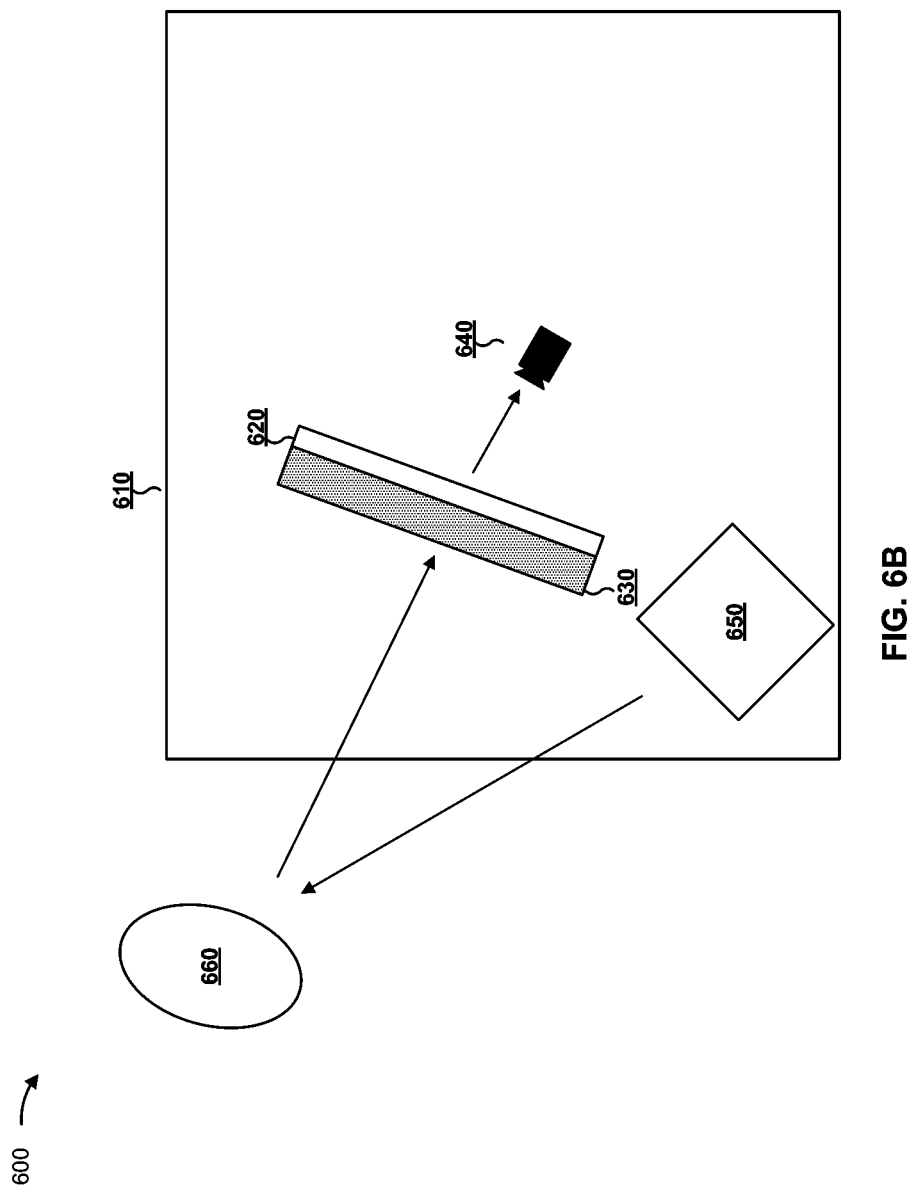

FIGS. 6A-6B are diagrams of one or more example implementations 600 described herein. As shown in FIG. 6A, example implementation(s) 600 may include a sensor system 610. Sensor system 610 may be a portion of an optical system and may provide an electrical output corresponding to a sensor determination. Sensor system 610 includes an optical filter structure 620, which includes an optical filter 630, and an optical sensor 640. For example, optical filter structure 620 may include an optical filter 630 that performs a passband filtering functionality or another type of optical filter. Sensor system 610 includes an optical transmitter 650 that transmits an optical signal toward a target 660 (e.g., a person, an object, and/or the like).

Although implementations may be described herein in terms of an optical filter in a sensor system, implementations described herein may be used in another type of system, may be used external to the sensor system, and/or the like.

As further shown in FIG. 6A, and by reference number 670, an input optical signal is directed toward optical filter structure 620. The input optical signal may include MR light emitted by optical transmitter 650 and ambient light from the environment in which sensor system 610 is being utilized. For example, when optical filter 630 is a bandpass filter, optical transmitter 650 may direct near infrared (NIR) light toward a user for a gesture recognition system (e.g., of a gesture performed by target 660), and the MR light may be reflected off target 660 (e.g., a user) toward optical sensor 640 to permit optical sensor 640 to perform a measurement of the MR light. In this case, ambient light may be directed toward optical sensor 640 from one or more ambient light sources (e.g., a light bulb or the sun). In another example, multiple light beams may be directed toward target 660 and a subset of the multiple light beams may be reflected toward optical filter structure 620, which may be disposed at a tilt angle relative to optical sensor 640, as shown. In some implementations, another tilt angle may be used (e.g., a 0-degree tilt angle for a bandpass filter).

In some implementations, optical filter structure 620 may be disposed and/or formed directly onto optical sensor 640, rather than being disposed a distance from optical sensor 640. For example, optical filter structure 620 may be coated and patterned onto optical sensor 640 using, for example, photolithography. In another example, optical transmitter 650 may direct MR light toward another type of target 660, such as for detecting objects in proximity to a vehicle, detecting objects in proximity to a blind person, detecting a proximity to an object (e.g., using a LIDAR technique), and/or the like, and the MR light and ambient light may be directed toward optical sensor 640 as a result.

As further shown in FIG. 6A, and by reference number 680, a portion of the optical signal is passed by optical filter 630 and optical filter structure 620. For example, optical filter 630 may include any of optical filter coating portion 410 of the optical filter 400, described above, and may cause a portion of light to be reflected in a first direction. In this case, optical filter 630 blocks visible light of the input optical signal without excessively blocking MR light and without introducing an excessive angle-shift with an increase in an angle of incidence of the input optical signal.

As further shown in FIG. 6A, and by reference number 690, based on the portion of the optical signal being passed to optical sensor 640, optical sensor 640 may provide an output electrical signal for sensor system 610, such as for use in recognizing a gesture of the user or detecting the presence of an object. In some implementations, another arrangement of optical filter 630 and optical sensor 640 may be utilized. For example, rather than passing the second portion of the optical signal collinearly with the input optical signal, optical filter 630 may direct the second portion of the optical signal in another direction toward a differently located optical sensor 640. In another example, optical sensor 640 may be an avalanche photodiode, an Indium-Gallium-Arsenide (InGaAs) detector, an infrared detector, and/or the like.

As shown in FIG. 6B, a similar example implementation 600 may include sensor system 610, optical filter structure 620, optical filter 630, optical sensor 640, optical transmitter 650, and target 660. FIG. 6B shows a particular example implementation 600 that includes an optical filter 630 as described herein.

Optical transmitter 650 emits light at an emission wavelength in a wavelength range of 800 nm to 1100 nm. Optical transmitter 650 emits modulated light (e.g., light pulses). Optical transmitter 650 may be a light-emitting diode (LED), an LED array, a laser diode, or a laser diode array. Optical transmitter 650 emits light towards target 660, which reflects the emitted light back towards sensor system 610. When sensor system 610 is a gesture-recognition system, target 660 is a user of the gesture-recognition system. Sensor system 610 may also be a proximity sensor system, a three-dimensional (3D) imaging system, distance sensing system, a depth sensor, and/or another suitable sensor system.

Optical filter 630 is disposed to receive the emitted light after reflection by target 660. Optical filter 630 has a passband including the emission wavelength and at least partially overlapping with the wavelength range of 800 nm to 1100 nm. Optical filter 630 is a bandpass filter, such as an ITF bandpass filter. Optical filter 630 transmits the emitted light from the optical transmitter 650, while substantially blocking ambient light.

Optical sensor 640 is disposed to receive the emitted light after transmission by optical filter 630. In some implementations, optical filter 630 is formed directly on optical sensor 640. For example, optical filter 630 may be coated and patterned (e.g., by photolithography) on sensors (e.g., proximity sensors) in wafer level processing (WLP).

When sensor system 610 is a proximity sensor system, optical sensor 640 is a proximity sensor, which detects the emitted light to sense a proximity of target 660. When sensor system 610 is a 3D-imaging system or a gesture-recognition system, optical sensor 640 is a 3D image sensor (e.g., a charge-coupled device (CCD) chip or a complementary metal oxide semiconductor (CMOS) chip), which detects the emitted light to provide a 3D image of target 660, which, for example, is the user. The 3D image sensor converts the optical information into an electrical signal for processing by a processing system (e.g., an application-specific integrated circuit (ASIC) chip or a digital signal processor (DSP) chip). When sensor system 610 is a gesture-recognition system, the processing system processes the 3D image of the user to recognize a gesture of the user. Other types of sensor systems 610 may be possible.

As indicated above, FIGS. 6A-6B are provided merely as one or more example. Other examples may differ from what is described with regard to FIGS. 6A-6B.

Figure 7:
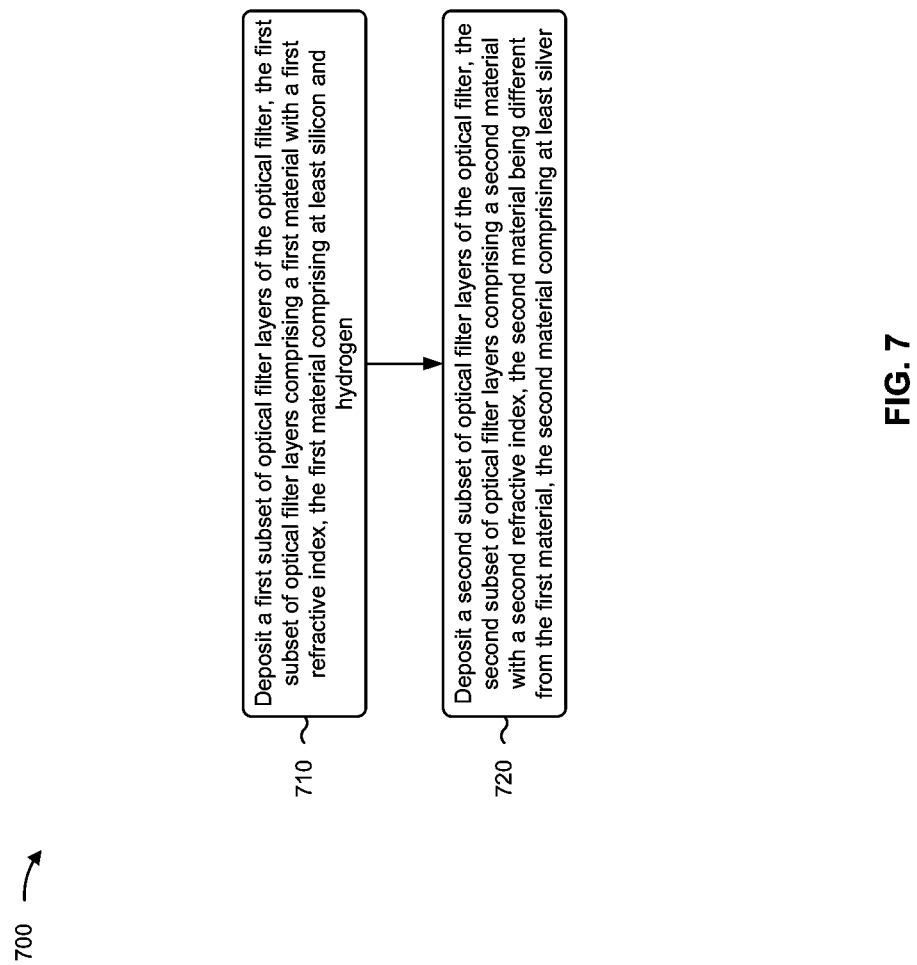
FIG. 7 is a flowchart of example processes relating to manufacturing an induced transmission filter, in accordance with various implementations described herein.

FIG. 7 is a flowchart of an example process 700 associated with fabrication of an ITF bandpass filter with hydrogenated silicon and silver. In some implementations, one or more process blocks of FIG. 7 may be performed by a fabrication device (e.g., the sputter deposition system of FIGS. 5A-5D).

As shown in FIG. 7, process 700 may include depositing a first subset of optical filter layers of the optical filter, the first subset of optical filter layers comprising a first material with a first refractive index, the first material comprising at least silicon and hydrogen (block 710). For example, the fabrication device may deposit a first subset of optical filter layers of the optical filter, the first subset of optical filter layers comprising a first material with a first refractive index, the first material comprising at least silicon and hydrogen, as described above.

As further shown in FIG. 7, process 700 may include depositing a second subset of optical filter layers of the optical filter, the second subset of optical filter layers comprising a second material with a second refractive index, the second material being different from the first material and the second refractive index being less than the first refractive index, the second material comprising at least silver (block 720). For example, the fabrication device may deposit a second subset of optical filter layers of the optical filter, the second subset of optical filter layers comprising a second material with a second refractive index, the second material being different from the first material and the second material comprising at least silver, as described above.

Process 700 may include additional implementations, such as any single implementation or any combination of implementations described below and/or in connection with one or more other processes described elsewhere herein.

In a first implementation, depositing the first subset of optical filter layers includes sputtering the first subset of optical filter layers using a first target.

In a second implementation, alone or in combination with the first implementation, depositing the second subset of optical filter layers includes sputtering the second subset of optical filter layers using a second target.

In a third implementation, alone or in combination with one or more of the first and second implementations, process 700 includes depositing a third subset of optical filter layers of the optical filter, the third subset of optical filter layers comprising a third material with a third refractive index.

In a fourth implementation, alone or in combination with one or more of the first through third implementations, the first material is hydrogenated silicon (SiH), the second material is silver (Ag), and the third material is silicon dioxide ($SiO_2$).

In a fifth implementation, alone or in combination with one or more of the first through fourth implementations, the third subset of optical filter layers is deposited using at least one of a first target used to deposit the first subset of optical filter layers or a second target used to deposit the second subset of optical filter layers.

In a sixth implementation, alone or in combination with one or more of the first through fifth implementations, the optical filter is manufactured using a single vacuum chamber.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, etc., depending on the context.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An induced transmission filter, comprising:
a set of optical filter layers including:
a first subset of optical filter layers comprising a first material with a first refractive index,
the first material comprising at least one of:
a hydrogenated silicon (Si:H) material,
an amorphous silicon (a-Si) material,
a silicon-germanium (SiGe) material, or
a hydrogenated silicon-germanium (SiGe:H) material;
a second subset of optical filter layers comprising a second material with a second refractive index,
the second material being different from the first material,
the second material comprising at least silver, and
a layer of the second subset of optical filter layers being sandwiched, without intervening layers, by a pair of layers of the first subset of optical filter layers; and
a third subset of optical filter layers comprising a third material with a third refractive index,
the third material comprising silicon dioxide (SiO2), and
the induced transmission filter having a thickness of less than 700 nanometers (nm).

2. The induced transmission filter of claim 1, where the first material is at least one of:
the Si:H material, or
the a-Si material.

3. The induced transmission filter of claim 1, wherein the first material is at least one of:
the SiGe material, or
the SiGe:H material.

4. The induced transmission filter of claim 1, where the first refractive index is greater than 3.3 at a spectral range of approximately 800 nanometers (nm) to approximately 1700 nm.

5. The induced transmission filter of claim 1, wherein a relative angle shift of the induced transmission filter is less than 1.5% at an angle of incidence between 0 degrees and 40 degrees.

6. The induced transmission filter of claim 1, wherein a relative angle shift of the induced transmission filter is less than 1.0% at an angle of incidence between 0 degrees and 40 degrees.

7. The induced transmission filter of claim 1, wherein a relative angle shift of the induced transmission filter is less than 0.5% at an angle of incidence between 0 degrees and 40 degrees.

8. The induced transmission filter of claim 1, wherein the third subset of optical filter layers comprises alternating layers of the silicon dioxide and amorphous silicon.

9. The induced transmission filter of claim 1, further comprising:
a substrate onto which the set of optical filter layers are disposed.

10. The induced transmission filter of claim 9, wherein the set of optical filter layers is disposed onto a first side of the substrate, and further comprising:
a coating disposed onto a second side of the substrate.

11. The induced transmission filter of claim 10, wherein the coating is a blocking filter or a bandpass filter.

12. A method of making an optical filter comprising:
depositing a first subset of optical filter layers of the optical filter,
the first subset of optical filter layers comprising a first material with a first refractive index,
the first material comprising hydrogenated silicon (Si:H);
depositing a second subset of optical filter layers of the optical filter,
the second subset of optical filter layers comprising a second material with a second refractive index,
the second material being different from the first material,
the second material comprising at least silver (Ag), and a layer of the second subset of optical filter layers being sandwiched, without intervening layers, by a pair of layers of the first subset of optical filter layers; and depositing a third subset of optical filter layers of the optical filter, the third subset of optical filter layers comprising a third material with a third refractive index, the third material comprising silicon dioxide (SiO2), and the optical filter having a thickness of less than 700 nanometers (nm).

13. The method of claim 12, wherein depositing the first subset of optical filter layers comprises:

sputtering the first subset of optical filter layers using a first target.

14. The method of claim 12, wherein depositing the second subset of optical filter layers comprises:

sputtering the second subset of optical filter layers using a second target.

15. The method of claim 12, wherein the third subset of optical filter layers is deposited using at least one of a first target used to deposit the first subset of optical filter layers or a second target used to deposit the second subset of optical filter layers.

16. The method of claim 12, wherein the optical filter is manufactured using a single vacuum chamber.

17. An optical system, comprising:

an optical filter to filter an input optical signal and provide a filtered input optical signal, the optical filter comprising:

a set of optical filter layers including:

a first subset of optical filter layers comprising a first material with a first refractive index, the first material comprising a hydrogenated silicon (Si:H) material;

a second subset of optical filter layers comprising a second material with a second refractive index, a layer of the second subset of optical filter layers being deposited directly on a first layer of the first subset of optical filter layers, a second layer of the first subset of optical filter layers being deposited directly on the layer of the second subset of optical filter layers, the second material being different from the first material, and the second material comprising at least silver; and a third subset of optical filter layers comprising a third material with a third refractive index, the third material comprising silicon dioxide (SiO2); and an optical receiver to receive the filtered input optical signal and provide an output electrical signal.

18. The optical system of claim 17, further comprising:

an optical transmitter to transmit an output optical signal, wherein the input optical signal comprises at least the output optical signal and an ambient optical signal.

19. The optical system of claim 17, where the optical filter is associated with greater than 50% transmissivity at approximately 950 nanometers.

20. The optical system of claim 17, wherein the optical filter comprises:

a substrate; and another set of optical filter layers, wherein the set of optical filter layers is disposed on a first side of the substrate and the other set of optical filter layers is disposed on a second side of the substrate.

* * * * *